(12) United States Patent
Waltermann et al.

(10) Patent No.: US 10,135,782 B2
(45) Date of Patent: Nov. 20, 2018

(54) DETERMINING CLOSE CONTACTS USING COMMUNICATION DATA

(71) Applicant: Lenovo (Singapore) Pte. Ltd., Singapore (SG)

(72) Inventors: Rod D. Waltermann, Rougemont, NC (US); Erin Carolyn Solfiell Acquesta, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 480 days.

(21) Appl. No.: 14/744,531

(22) Filed: Jun. 19, 2015

(65) Prior Publication Data

US 2016/0373401 A1 Dec. 22, 2016

(51) Int. Cl.
*H04L 12/58* (2006.01)
*G06Q 50/00* (2012.01)
*H04L 29/08* (2006.01)

(52) U.S. Cl.
CPC ............ *H04L 51/34* (2013.01); *G06Q 50/01* (2013.01); *H04L 51/04* (2013.01); *H04L 67/306* (2013.01)

(58) Field of Classification Search
CPC ....... H04L 51/34; H04L 51/04; H04L 67/306; G06Q 50/01
USPC ......................................... 709/203, 205, 206
See application file for complete search history.

(56) References Cited

U.S. PATENT DOCUMENTS

| | | | | |
|---|---|---|---|---|
| 5,839,075 A | * | 11/1998 | Haartsen | H04W 88/06 455/450 |
| 6,329,904 B1 | * | 12/2001 | Lamb | G01W 1/00 340/286.02 |
| 6,606,494 B1 | * | 8/2003 | Arpee | H04W 24/00 455/422.1 |
| 7,145,898 B1 | * | 12/2006 | Elliott | H04L 12/66 370/352 |
| 7,400,264 B2 | * | 7/2008 | Boaz | G01D 4/004 340/870.01 |
| 7,783,457 B2 | * | 8/2010 | Cunningham | G08B 25/009 340/539.21 |
| 8,615,019 B1 | * | 12/2013 | Kruse | H04L 61/2038 370/437 |
| 8,649,774 B1 | * | 2/2014 | Zheng | H04M 1/575 340/7.58 |
| 9,723,510 B1 | * | 8/2017 | Beluri | H04W 24/10 |
| 9,794,942 B1 | * | 10/2017 | Arrakoski | H04B 17/318 |
| 2005/0197127 A1 | * | 9/2005 | Nakasaku | H04W 40/12 455/445 |
| 2005/0270173 A1 | * | 12/2005 | Boaz | H04Q 9/00 340/870.02 |

(Continued)

*Primary Examiner* — Thu Ha T Nguyen
(74) *Attorney, Agent, or Firm* — Ference & Associates LLC

(57) ABSTRACT

One embodiment provides a method including: accessing, using a processor, communication data received at an electronic device of a first entity; identifying, using a processor, a communication between the first entity and a second entity; determining, using a processor, a strength of the communication between the first entity and the second entity; determining, using a processor, a directionality of the communication between the first entity and the second entity; and assigning, using a processor, the second entity as a close contact of the first entity based on the strength of the communication and directionality of the communication. Other aspects are described and claimed.

23 Claims, 5 Drawing Sheets

(56) References Cited

U.S. PATENT DOCUMENTS

| | | | | |
|---|---|---|---|---|
| 2006/0072474 | A1* | 4/2006 | Mitchell | H04L 43/12 370/252 |
| 2006/0277312 | A1* | 12/2006 | Hirsch | H04L 63/0492 709/229 |
| 2008/0095339 | A1* | 4/2008 | Elliott | H04L 12/14 379/93.01 |
| 2011/0069653 | A1* | 3/2011 | Wang | H04L 12/1868 370/312 |
| 2011/0317223 | A1* | 12/2011 | Nagao | H04N 1/00347 358/442 |
| 2013/0094390 | A1* | 4/2013 | Chhabra | H04W 48/20 370/252 |
| 2013/0163733 | A1* | 6/2013 | Aerrabotu | H04M 11/00 379/93.17 |
| 2013/0301474 | A1* | 11/2013 | Suwa | H04W 84/20 370/254 |
| 2013/0336180 | A1* | 12/2013 | Park | H04W 72/087 370/294 |
| 2015/0222699 | A1* | 8/2015 | Quinn | H04L 67/1091 709/203 |
| 2015/0278799 | A1* | 10/2015 | Palanisamy | G06Q 20/363 705/76 |
| 2015/0280810 | A1* | 10/2015 | Beals | H04B 7/1851 455/13.1 |
| 2016/0143076 | A1* | 5/2016 | Razavi | H04L 67/101 370/329 |
| 2016/0205254 | A1* | 7/2016 | Luers | H04M 3/5232 379/265.14 |
| 2016/0248483 | A1* | 8/2016 | Ahmadi | H04B 7/024 |
| 2017/0068976 | A1* | 3/2017 | Wawrzynowicz | G06Q 30/0203 |

* cited by examiner

DETERMINING CLOSE CONTACTS USING COMMUNICATION DATA

BACKGROUND

People use information handling devices (e.g., tablets, smart phones, laptop computers, personal computers, etc.) to send and receive communications (e.g., email, text messages, video messages, etc.). For relationships that a user may consider more important, the amount and type of communications may be different than those that are not considered important. For example, a boss and employee may only communicate through email and forgo other communication methods. In some cases, the communication relationships may be one-sided. For example, a website vendor may send emails regarding sales or ordered products, but the recipient will rarely if ever respond directly to those emails. Determining the communications which should be considered important can be difficult.

BRIEF SUMMARY

In summary, one aspect provides a method, comprising: accessing, using a processor, communication data received at an electronic device of a first entity; identifying, using a processor, a communication between the first entity and a second entity; determining, using a processor, a strength of the communication between the first entity and the second entity; determining, using a processor, a directionality of the communication between the first entity and the second entity; and assigning, using a processor, the second entity as a close contact of the first entity based on the strength of the communication and directionality of the communication.

Another aspect provides an information handling device, comprising: a receiver that receives communications; a display that displays the communications; a processor; a memory device that stores instructions executable by the processor to: access communication data received at an electronic device of a first entity; identify a communication between the first entity and a second entity; determine a strength of the communication between the first entity and the second entity; determine a directionality of the communication between the first entity and the second entity; and assign the second entity as a close contact of the first entity based on the strength of the communication and directionality of the communication.

A further aspect provides a product, comprising: a storage device that stores code executable by a processor, the code comprising: code that accesses communication data received at an electronic device of a first entity; code that identifies a communication between the first entity and a second entity; code that determines a strength of the communication between the first entity and the second entity; code that determines a directionality of the communication between the first entity and the second entity; and code that assigns the second entity as a close contact of the first entity based on the strength of the communication and directionality of the communication.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
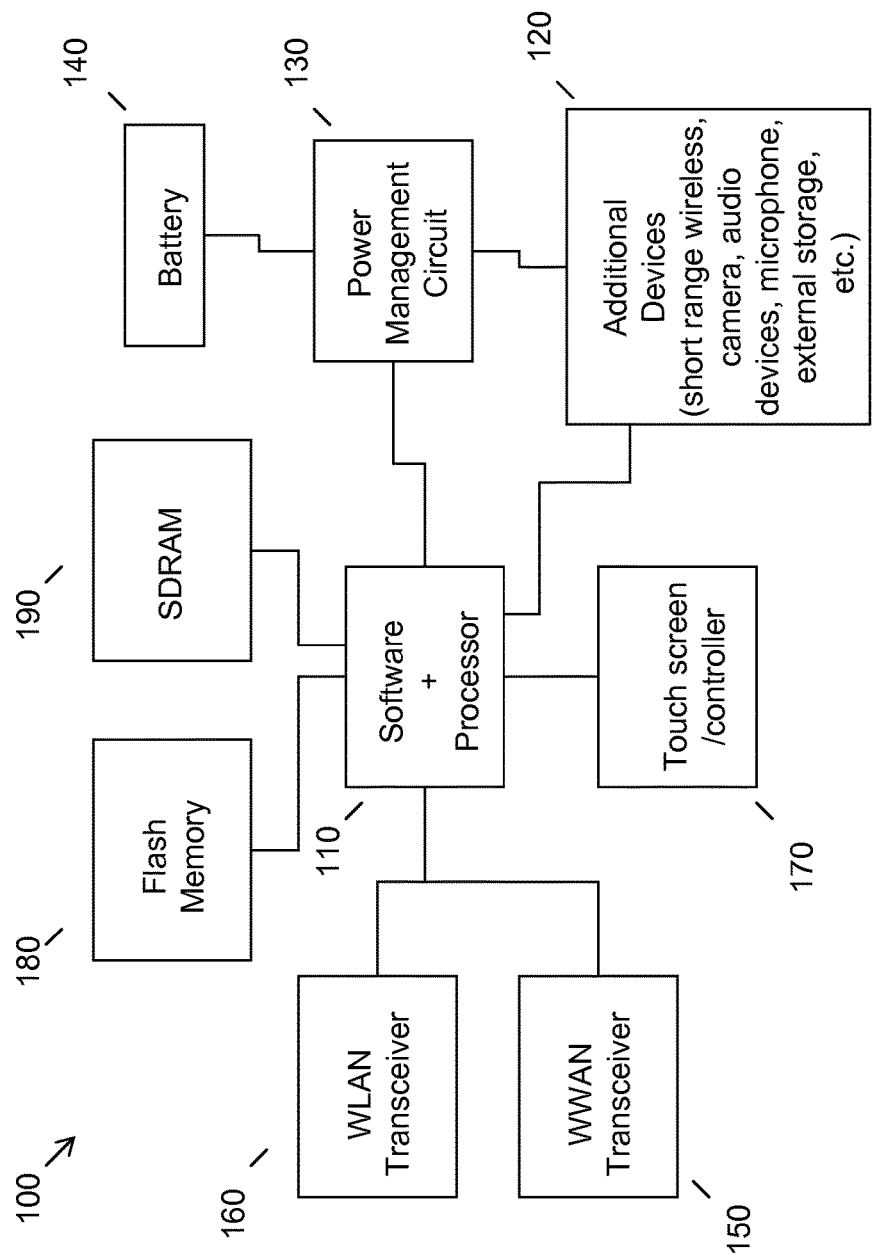
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The increase in communications (e.g., messages, video messages, voice calls, emails, etc.) between users results in a large amount of data for a user to manage. Sometimes, in order to more quickly process communications, a user chooses to deal with communications which the user considers important first. The user may make this decision based upon the relationship that the user has with the sender, the subject of the communication, when the communication was sent, or a variety of other criteria. However, this requires that a user at least cursorily spends time with each communication, even if it is just to determine that it is not something that needs immediate attention.

In order to assist a user in processing all this communication, entities may put in place systems which help analyze the communications and help to determine whether they should be considered important. For example, an email program may determine that a communication is important and may mark the email with a flag or other indicator showing its importance. However, this type of solution requires the user to provide input into what communications should be considered important. For example, a user may receive an email and the user can mark the email as important. The system then learns that the user desires such communications to be considered important. One issue with this method is that the system has to guess to why the user marked this particular communication as important. For example, was it the sender, the subject, the timing, or something else which caused the user to mark these as important?

In other words, current solutions include machine learning methods which require training sets. To train these training sets, large amounts of data are required. These training sets may additionally require a user train the system to learn what should be considered important. Additionally, many of the systems which include machine learning methods require large amounts of computation, resulting in a time consuming and cumbersome system.

These technical issues present problems for entities in that it may be difficult to determine what communications and relationships are important to users. Conventional methods for determining importance of relationships and communications tend to require large amounts of data and time consuming computation on the part of the system. Additionally, many conventional methods require input from a user to train the system in making the determination of important relationships. As such a technical problem is found in that current systems fail to leverage methods for identifying importance of relationships using less time consuming and data intensive methods.

Accordingly, an embodiment provides a method of assisting in identifying important communications and assigning entities as close contacts by determining the strength of the communications between the entities. One embodiment may determine how many communications are exchanged between two entities versus how many communications a single user exchanges overall, which may be used to determine the strength of the communications between the two entities. For example, if a user exchanges one hundred communications with another user, the system may determine whether that relationship is strong based upon the total number of communications the user exchanges with everyone. In other words, if a user has a total number of one hundred fifty communications, the one hundred communications with the other user may indicate a strong relationship. If, however, the user has a total number of ten thousand communications, the one hundred communications with the other user may indicate a weak relationship.

An embodiment may additionally support its determination of the importance of a relationship by determining the directionality of the communication. For example, if a user receives ten communications from an entity but never responds to those communications, this may indicate that the relationship is not that important to a user. Based upon the strength of the communications and directionality of the communication, an embodiment may be able to assign a second entity as a close contact of the first entity. Additionally, based upon the strength of the communications and directionality of the communications, an embodiment may be able to ascertain the importance and type of relationship (e.g., work, personal, association, vendor/buyer, etc.) that a person holds with another entity. In one embodiment, the type of relationship two entities have may be determined using thematic analysis techniques.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
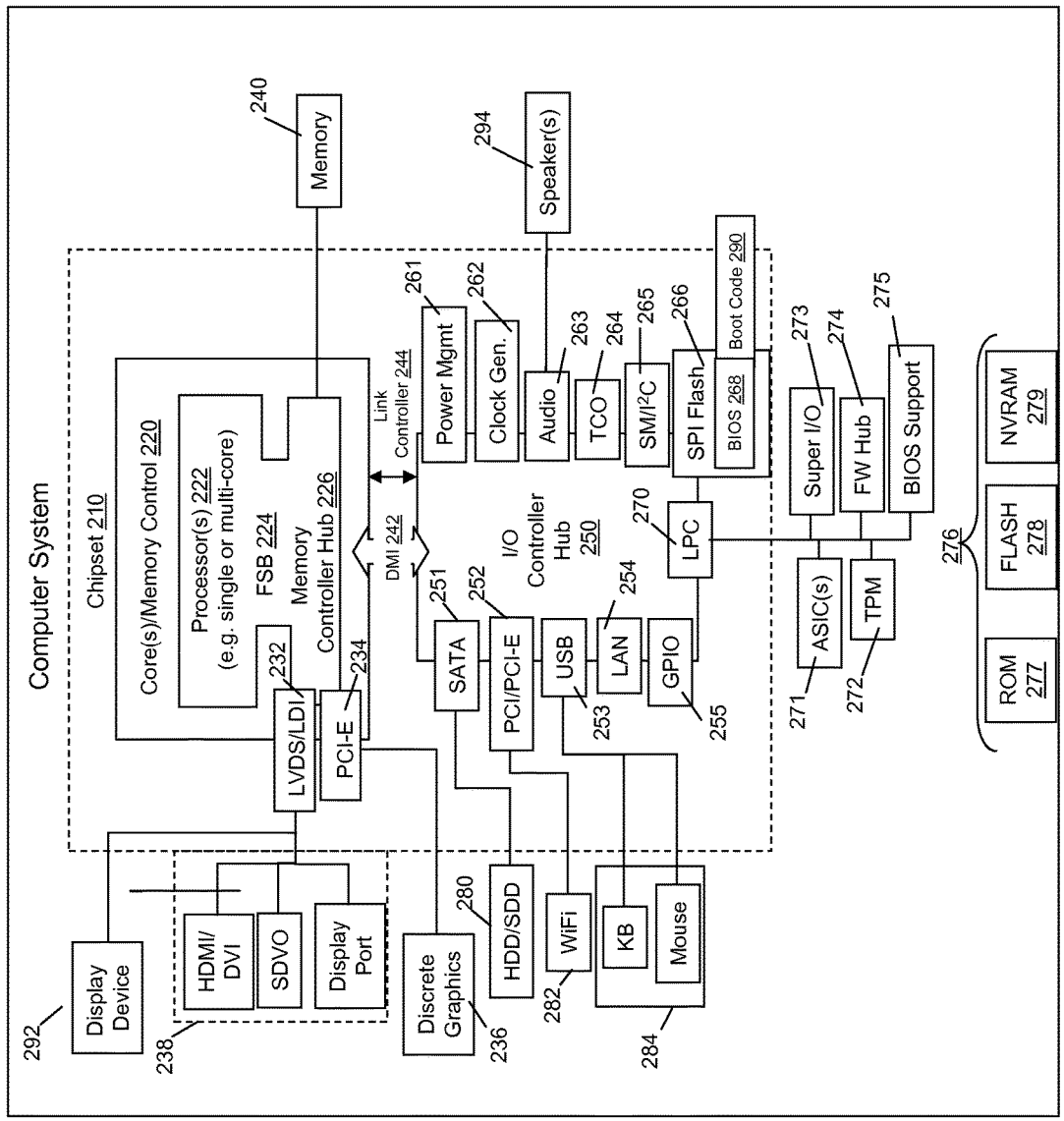
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mouse, camera, phone, microphone, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to exchange communications between themselves and other entities. Additionally, such devices may be used to analyze communications for importance. For example, the circuitry outlined in FIG. 1 may be implemented in a tablet or smart phone embodiment, whereas the circuitry outlined in FIG. 2 may be implemented in a personal computer embodiment. Additionally, circuitry as outlined in FIG. 1 and/or FIG. 2 may be used in a cloud service device or devices.

Figure 3:
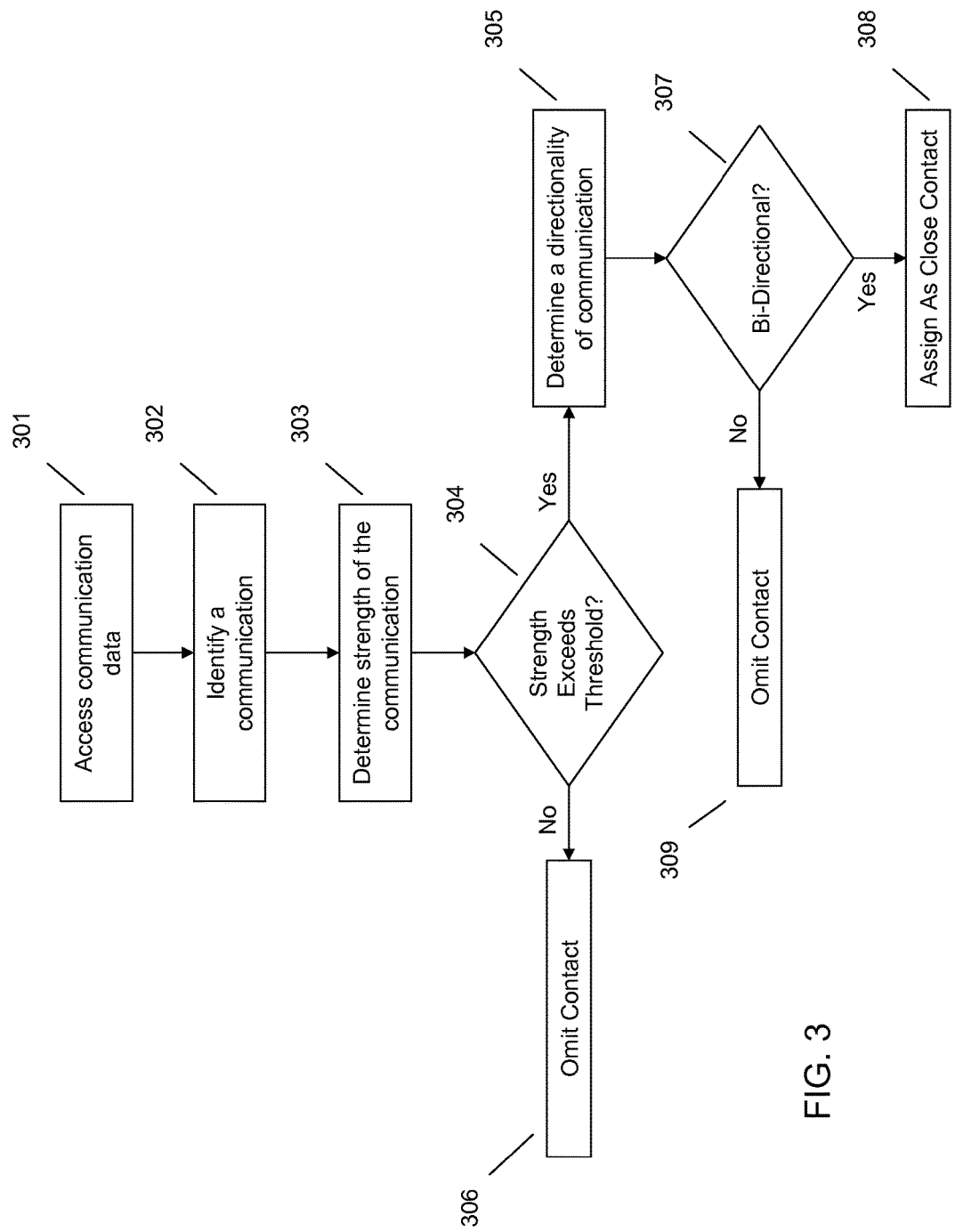
FIG. 3 illustrates an example method of determining close contacts using communication data.

Referring now to FIG. 3, at 301, an embodiment may access communication data. This communication data may have been received at an electronic device of a first entity/user. The communication data may include any communications that a user exchanges. For example, the communication data may include messages (e.g., instant messages, text messages, voice messages, etc.), voice calls (e.g., telephone calls, voice over internet protocol (VoIP), etc.), video messages (e.g., video conferencing, video calls, etc.), emails, social media exchanges, and the like. Accessing may include leaving the communication data at the storage location and just using the data. Alternatively, accessing may include moving the data from a source storing the communications to another storage location. For example, accessing may include receiving the data from a source storing communications. For example, an email server may store all the email communications for a user and the email server may upload the email communications to an embodiment or a location accessible by an embodiment. Alternatively or additionally, the accessing may include retrieving or requesting the communication data from a location. For example, a text messaging application may contain all the text messages for a user and an embodiment may retrieve these text communications from the text messaging application. Other methods for accessing the communication data are possible and contemplated.

Once an embodiment accesses the communication data at 301, an embodiment may identify a communication between the first entity and a second entity at 302. In one embodiment the identification of communication may additionally include identifying an amount of communication, which may include determining a number of communications between the two entities. For example, an embodiment may identify how many communications a user has exchanged with another user. In addition, an embodiment may identify the total number of communications a user has exchanged.

Based upon the communication identified between the two entities at 302, an embodiment may determine a strength of the communications between the at least two entities at 303. In one embodiment determining the strength of communication may be based upon the level of communications. For example, the level of communication may be based on a length of communication(s). As an example, an embodiment may determine that a two hour video call may be comparable to fifty text messages. In other words, the level of communication may include a weighting based on the type of communication.

In one embodiment, the strength of communication may be based upon an amount of communications between the two entities. To make this determination, an embodiment may calculate a ratio between the amount of communication between the at least two entities versus an amount of total communication by one of the at least two entities. For example, an embodiment may determine that two entities have exchanged fifty communications and one of the two entities has exchanged one hundred communications total. An embodiment may then determine that 50% of that entity's communication is with the second entity. An example pseudo code calculation may look similar to the example below, with A and B representing the two entities.

$$\text{Strength}_A[A, B] = \frac{TotalEmailSent(A \to B) + TotalEmailRec(A \leftarrow B)}{TotalEmailSent(A) + TotalEmailRec(A)}$$

An embodiment may then calculate the same percentage indicator for the second entity.

An embodiment may then compute the relative strength between the at least two entities. The pseudo code flow below shows an example method for determining this relative strength between both users.

If ($\text{Strength}_E[A,B]$ and $\text{Strength}_A[A,B]!=0$) then $\text{Strength}[A,B]=\text{Strength}_A[A,B] \times \text{Strength}_B[A,B]$ else If ($\text{Strength}_B[A,B]==0$) then $\text{Strength}[A,B]=(\text{Strength}_A[A,B])^2$ else If ($\text{Strength}_A[A,B]==0$) then $\text{Strength}[A,B]=(\text{Strength}_B[A,B])^2$ The last two "else If" statements may be used to cover the case where data is missing or either of the entities percentage indicators could not be calculated and was thus set to zero. By squaring the known data, the calculated percentage is prevented from becoming part of the noise, since the other factors are a multiplier of two values.

Figure 4:
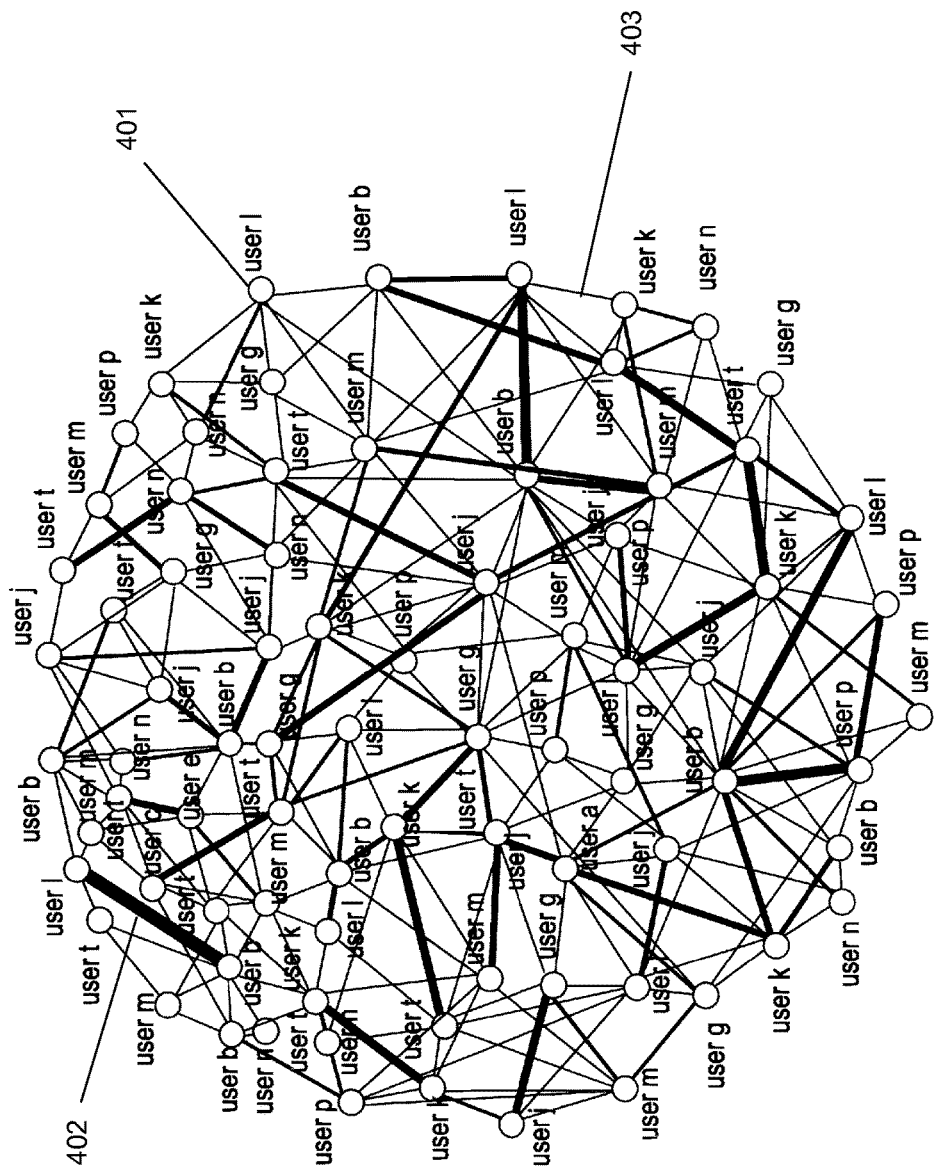
FIG. 4 illustrates an example graphical representation of determining close contacts using communication data.

Using the strength of relationship calculation, an embodiment may create a graphical representation indicating the strength of relationships between two or more entities. The relative strength factor discussed above may be used to set the width of the connecting lines between two entities in the graphical representation. An example graphical representation of the strength of relationships is shown in FIG. 4. The different entities may be shown by vertexes as shown at 401. Communications between two entities may be shown with connecting lines, for example 402 and 403, between the two vertexes which designate the two entities. The thicker line, for example at 402, may show a strong relationship between the two entities connected by the line as compared to other relationships each entity may have with another entity. The thinner line, for example at 403, may indicate a weaker relationship between the two entities connected by the line as compared to other relationships each entity may have with another entity.

The determination at 303 may additionally include determining whether the amount of communication between the two entities has exceeded a particular threshold at 304. This threshold may include a default threshold or may be set by a user. If an embodiment determines that the strength of the communication does not exceed the predetermined threshold at 304, an embodiment may omit the contact at 306.

If, however, an embodiment does determine that the strength of the relationship exceeds the threshold at 304, an embodiment may, at 305, determine a directionality of the communication. In one embodiment this determination is made by determining if the communication between the two entities is bi-directional at 307. For example, one entity may send more communications than the other. This information may be used to determine how important one entity is to the other. For example, if a user places an order with a vendor, the vendor may send multiple emails to the user. However, the user may never respond to those emails. An embodiment may make this determination by calculating a ratio of the amount of communication from the first entity to the second entity versus the amount of communication from the second entity to the first entity. Using this calculation, an embodiment may identify a direction of the communication. For example, an embodiment may determine whether the relationship is a strongly one-sided relationship and in which direction. If the direction of communication is indicated as one-sided, an embodiment may determine that the relationship is not important to both entities.

An embodiment may calculate direction by dividing the total number of emails one entity sent to the other by the total number of emails the other entity sent to the first entity. Worded differently, an embodiment may calculate direction by dividing the total number emails one entity sent to the other by the total number of emails the entity received from the other entity. An example pseudo code for this calculation is shown below.

If$(TotalEmailRec(A \leftarrow B) != 0)$ then $$\text{Direction}[A, B] = \frac{TotalEmailSent(A \rightarrow B)}{TotalEmailRec(A \leftarrow B)}$$

else Direction$[A, B] = TotalEmailSent(A \rightarrow B)$

Using this pseudo code or calculation, any value greater than 1 indicates that entity A communicates more to entity B. Any value less than 1 indicates that entity B communicates more to entity A. Any value equal to or very near 1 indicates a balanced level of communication.

One embodiment, rather than performing the above calculation, may determine direction using a polynomial fit (spline fit). Setting defined peaks and valleys to represent strong one-sided communication a polynomial, for example p(x), can be defined such that the vertices of the polynomial agree with the corresponding peaks and valleys. Using a simple function $f(A,B)$ as a rudimentary representation for the communication between entity A and entity B direction may be defined per the following example.

If TotatEmailSent$(A \rightarrow B) \approx$ TotalEmailSent$(B \rightarrow A)$ then Direction$[A,B]=p(f(A,B))\approx 0$ If TotalEmailSent$(A \rightarrow B)==0$ then Direction$[A,B]=p(f(A,B))=$valley If TotalEmailSent$(B \rightarrow A)==0$ then Direction$[A,B]=p(f(A,B))=$peak If an embodiment determines that the directionality indicates that communication is not bi-directional at 307, an embodiment may omit the contact at 309. If, however, an embodiment determines that the directionality indicates the communication is bi-direction at 307, an embodiment may assign the second entity as a close contact of the first entity. Once the close contacts are determined, an embodiment may create a close contact list. This list may be stored on a local device or may be stored on a device separate from the local device (e.g., remote storage, cloud storage, removable storage, etc.). Being assigned as a close contact may result in an embodiment allowing the second entity additional permissions. For example, if the second entity is considered a close contact, an embodiment may permit access to an application associated on the first entity's electronic device.

Figure 5:
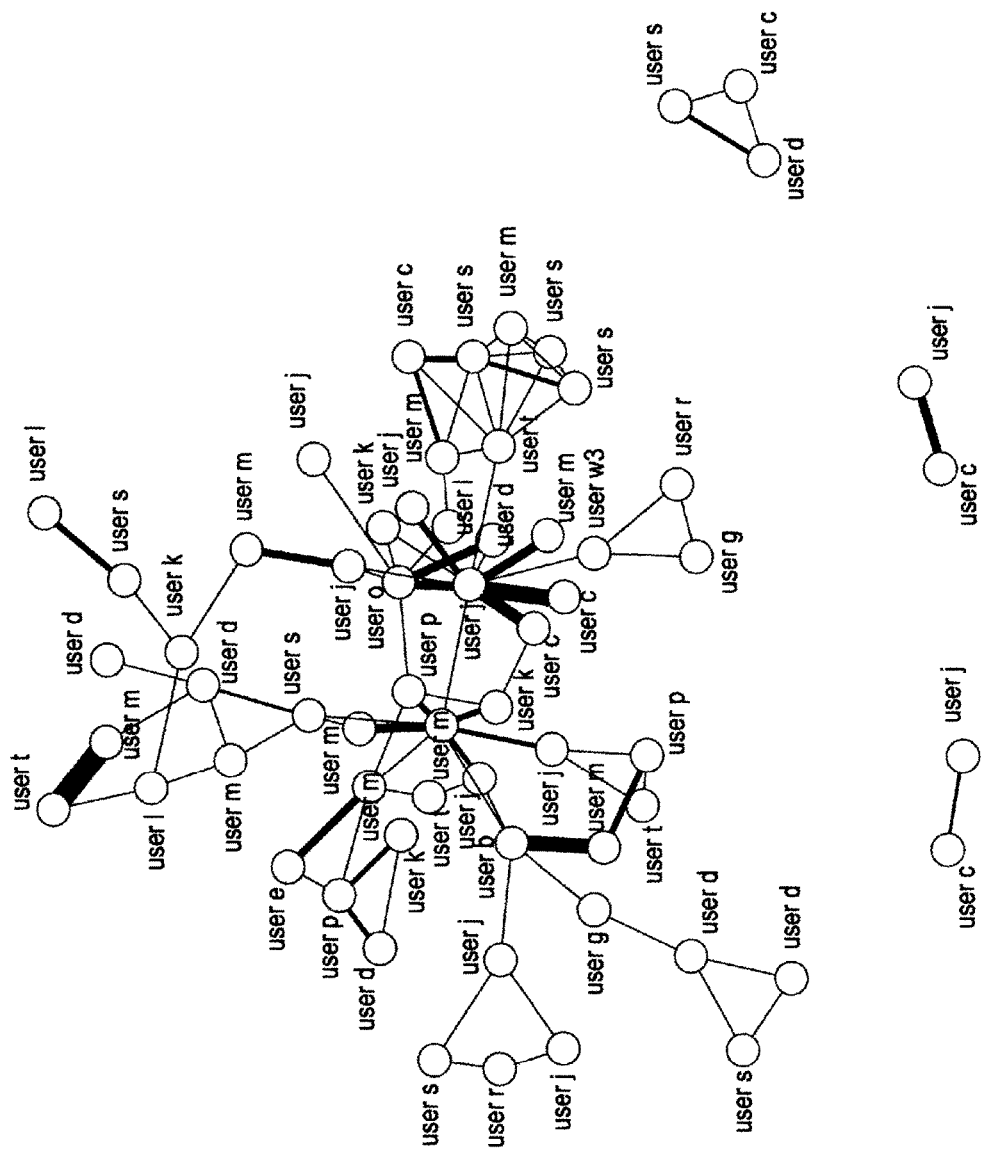
FIG. 5 illustrates another example graphical representation of determining close contacts using communication data.

In making a determination regarding whether the contact should be assigned as a close contact, an embodiment may use the strength of the communications and the directionality of the communications to determine an importance of the relationship. The importance of the relationship may be dependent on how much communication is exchanged between the two entities as discussed above. For example, if two entities exchange a large amount of communication and the communication is closely balanced, an embodiment may determine that these relationships are important to an entity. Once an importance of a relationship is determined, a graphical representation can be created, for example, as shown in FIG. 5. This figure is based upon FIG. 4. However, in this case the relationships have been cut by a selected criteria and only the top relationships are shown. These may indicate the most significant pairings out of all the relationships.

One embodiment may identify the type of relationship based upon the strength and direction of communication. For example, an embodiment may determine whether the relationship between the two entities is personal, work related, association (i.e., group) related, vendor related, a transient relationship (i.e., a relationship that is strong for a short period of time), or some other type of relationship. Additionally, an embodiment may further define the type of relationship into subcategories. For example, if the relationship is identified as personal, an embodiment may additionally be able to determine that the relationship is a familial relationship rather than just a friendly relationship.

The identification of the type of relationship may be made, in one embodiment, using thematic analysis techniques. This type of analysis involves identifying and recording themes or ideas within the communications, which would give an indication of the type of relationship. Using information indicating the type of relationship may allow an embodiment to perform additional actions. For example, the system may use this information to assist the user in identifying communications which may need immediate attention. For example, the system may determine that a user typically communicates with his spouse through text messaging or phone calls. If the system detects that the user's spouse has emailed him through his work email, the system may determine that this communication is very important and needs immediate attention since this type of communication is atypical between the two users.

The various embodiments described herein thus represent a technical improvement to current systems which assist in determining importance of communications. Using the techniques described herein, a system can identify the importance or type of a relationship using the strength or amount of communications between two entities. Additionally, an embodiment may use the direction of communications to assist in determining the importance or type of relationship. This helps reduce the time consuming and cumbersome conventional methods which require large amounts of data sets and computation. Additionally, the system as described herein requires less input from the user in order to make determinations about the importance and type of relationships.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    accessing, using a processor, communication data received at an electronic device of a first entity;
    identifying, using a processor, a communication relationship between the first entity and a second entity, wherein a communication relationship comprises a relationship having at least one communication between the first entity and the second entity;
    determining, using a processor, a strength of the communication relationship between the first entity and the second entity;
    determining, using a processor, a directionality of the communication relationship between the first entity and the second entity; and
    assigning, based on the identified communication relationship, the second entity as a close contact of the first entity based on the strength of the communication and directionality of the communication.

2. The method of claim 1, wherein the determining a directionality of the communication comprises identifying a communication sent by the first entity to the second entity.

3. The method of claim 1, wherein determining a directionality of the communication comprises identifying bi-directional communication.

4. The method of claim 1, wherein the determining a directionality of the communication comprises calculating a ratio of communications between the first entity and the second entity.

5. The method of claim 1, further comprising identifying a type of relationship based upon the strength of the communication and directionality of the communication.

6. The method of claim 5, wherein the identifying comprises using a thematic analysis technique.

7. The method of claim 5, wherein the type of relationship is selected from the group consisting of: work, personal, transient, and association.

8. The method of claim 1, further comprising permitting access to the close contact to at least one other application associated with the electronic device.

9. The method of claim 1, further comprising storing the close contact on a device separate from the electronic device.

10. The method of claim 1, wherein the communication between the first entity and the second entity comprises data selected from the group consisting of: email, message, video message, social media, and voice call.

11. The method of claim 1, wherein the determining a strength comprises determining a level of communication between the first entity and the second entity.

12. An information handling device, comprising:
a receiver that receives communications;
a display that displays the communications;
a processor;
a memory device that stores instructions executable by the processor to:
access communication data received at an electronic device of a first entity;
identify a communication relationship between the first entity and a second entity, wherein a communication relationship comprises a relationship having at least one communication between the first entity and the second entity;
determine a strength of the communication relationship between the first entity and the second entity;
determine a directionality of the communication relationship between the first entity and the second entity; and
assign, based on the identified communication relationship, the second entity as a close contact of the first entity based on the strength of the communication and directionality of the communication.

13. The information handling device of claim 12, wherein to determine a directionality of the communication comprises identifying a communication sent by the first entity to the second entity.

14. The information handling device of claim 12, wherein to determine a directionality of the communication comprises identifying bi-directional communication.

15. The information handling device of claim 12, wherein to determine a directionality of the communication comprises calculating a ratio of communications between the first entity and the second entity.

16. The information handling device of claim 12, wherein the instructions are further executable by the processor to identify a type of relationship based upon the strength of the communication and directionality of the communication.

17. The information handling device of claim 16, wherein to identify comprises using a thematic analysis technique.

18. The information handling device of claim 16, wherein the type of relationship is selected from the group consisting of: work, personal, transient, and association.

19. The information handling device of claim 12, wherein the instructions are further executable by the processor to permit access to the close contact to at least one other application associated with the electronic device.

20. The information handling device of claim 12, wherein the instructions are further executable by the processor to store the close contact on a device separate from the electronic device.

21. The information handling device of claim 12, wherein to determine a strength comprises determining a level of communication between the first entity and the second entity.

22. The information handling device of claim 12, wherein to determine a strength comprises determining that an amount of communication between the first entity and the second entity exceeds a threshold.

23. A product, comprising:
a storage device that stores code executable by a processor, the code comprising:
code that accesses communication data received at an electronic device of a first entity;
code that identifies a communication relationship between the first entity and a second entity, wherein a communication relationship comprises a relationship having at least one communication between the first entity and the second entity;
code that determines a strength of the communication relationship between the first entity and the second entity;
code that determines a directionality of the communication relationship between the first entity and the second entity; and
code that assigns, based on the identified communication relationship, the second entity as a close contact of the first entity based on the strength of the communication and directionality of the communication.

* * * * *